United States Patent
Allione (10) Patent No.: US 9,645,043 B2
(45) Date of Patent: May 9, 2017

(54) METHOD FOR CHECKING THE COMPLIANCE OF AN OPTICAL CHARACTERISTIC OF AN OPHTHALMIC LENS AND ASSOCIATED DEVICE

(71) Applicant: ESSILOR INTERNATIONAL (COMPAGNIE GENERALE D'OPTIQUE), Charenton le Pont (FR)

(72) Inventor: Pascal Allione, Charenton le Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 50 days.

(21) Appl. No.: 14/653,665

(22) PCT Filed: Dec. 19, 2013

(86) PCT No.: PCT/FR2013/053197
§ 371 (c)(1),
(2) Date: Jun. 18, 2015

(87) PCT Pub. No.: WO2014/111636
PCT Pub. Date: Jul. 24, 2014

(65) Prior Publication Data
US 2015/0300912 A1 Oct. 22, 2015

(30) Foreign Application Priority Data

Dec. 21, 2012 (FR) .................................... 12 62559

(51) Int. Cl.
*G01M 11/00* (2006.01)
*G01M 11/02* (2006.01)

(52) U.S. Cl.
CPC .... *G01M 11/0214* (2013.01); *G01M 11/0264* (2013.01); *G01M 11/0285* (2013.01)

(58) Field of Classification Search
CPC ......... G01M 11/0214; G01M 11/0264; G01M 11/0285
(Continued)

(56) References Cited

U.S. PATENT DOCUMENTS 6,573,997 B1 6/2003 Goldberg et al.

FOREIGN PATENT DOCUMENTS

DE   10 2007 057260 A1   6/2009
EP    1 324 015 A1       7/2003

OTHER PUBLICATIONS

International Search Report, dated Jun. 23, 2014, from corresponding PCT application.

*Primary Examiner* — Tri T Ton
(74) *Attorney, Agent, or Firm* — Young & Thompson (57) ABSTRACT

A method for checking the compliance of a checked optical characteristic of a checked ophthalmic lens (30) relative to an expected optical characteristic, from a non-deformed pattern (40) and a deformed pattern (20) each having a non-uniform contrast, the method includes the steps of: a) determining (A) an image pattern (50), which is the image of the deformed pattern through the checked ophthalmic lens, in predefined optical conditions, b) combining (B) the image pattern with the non-deformed pattern to form a test pattern (60), c) comparing (C) the test pattern with at least one reference pattern (70), and d) deducing (D) the compliance of the checked optical characteristic with the expected optical characteristic on the basis of the preceding comparison. A device for implementing such a checking method is also described.

20 Claims, 5 Drawing Sheets

METHOD FOR CHECKING THE COMPLIANCE OF AN OPTICAL CHARACTERISTIC OF AN OPHTHALMIC LENS AND ASSOCIATED DEVICE

TECHNICAL FIELD OF THE INVENTION

The present invention relates to a method for verifying the conformity of an optical characteristic of a corrective ophthalmic lens to an expected optical characteristic.

It also relates to a device for verifying the conformity of an optical characteristic of an ophthalmic lens to an expected optical characteristic.

PRIOR ART

It is important for an optician who receives an ophthalmic lens to be able to verify, rapidly and simply, that all of the optical characteristics of an ordered ophthalmic lens indeed correspond to the expected optical characteristics, especially depending on the prescription of the corresponding wearer.

This is all the more true since ophthalmic lenses have optical characteristics that are increasingly complex due to the development of ophthalmic lenses of personalized design.

For this reason, it is known to measure the frontal power of an ophthalmic lens by means of a manual lensmeter. Nevertheless, this type of apparatus is very sensitive to the centering of the ophthalmic lens on a holder of the apparatus and it allows power to be measured only locally, typically in a limited zone of about 5 to 10 millimeters (mm). This may for example be used to measure the distance and near vision power of progressive lenses.

Electronic lensmeters of the "lens-mapper" type produce a complete map of the optical powers of the ophthalmic lens but are in general expensive and difficult to use.

A measurement method is also known, from document EP 1 324 015, that uses a Moiré effect to measure the optical parameters of an ophthalmic lens, for example allowing a map of its optical power to be produced.

This measurement method exploits the combination of two images formed by the respective images of two periodic grids both seen through the ophthalmic lens to be verified. On being combined, these two images form a Moiré pattern, from which it is possible to calculate, provided a calibration step has been carried out beforehand, the optical characteristics of the ophthalmic lens.

The measurement method of document EP 1 324 015 therefore requires two separate grids to be used, each of which is imaged through the ophthalmic lens to be measured, thereby making its implementation difficult.

Moreover, it is also important for the optician to verify, on receiving a corrective ophthalmic lens, that the optical design specified for the lens by its designer has indeed been respected by the lens manufacturer. The optical design (conception optique or design optique in French) generates a distribution of optical powers corresponding to the sought-after correction.

The optical design of an ophthalmic lens is an optical characteristic specific to the designer of the lens.

Thus, in order to guarantee the conformity of the manufactured ophthalmic lens to the expected optical design, it is known to use identification means such as anti-counterfeiting labels (holographic tags; barcodes of the "Data Matrix" type, etc.) for example adhesively bonded to the front face of the lens. These identification means allow the ophthalmic lens to be traced from design to reception and serve to identify the designer of the ophthalmic lens. However, this type of means is easily falsifiable and does not guarantee a satisfactory level of security.

SUBJECT OF THE INVENTION

The present invention provides a method for rapidly and simply checking the optical performance of an ophthalmic lens. The method, which is inexpensive to implement, makes it possible to carry out a blanket check of the optical characteristics of the whole of an ophthalmic lens, or to check locally certain of its zones of interest.

More particularly, according to the invention a method is provided for verifying the conformity of a verified optical characteristic of a verified ophthalmic lens to an expected optical characteristic, on the basis of an undeformed test pattern and a deformed test pattern each having a nonuniform contrast, said method comprising steps of:

a) determining an image test pattern, i.e. the image of said deformed test pattern through said verified ophthalmic lens, under set optical conditions;

b) combining said image test pattern with said undeformed test pattern in order to form a test test pattern;

c) comparing said test test pattern to at least one reference test pattern; and d) deducing the conformity of said verified optical characteristic to said expected optical characteristic depending on the comparison of step c).

Depending on said deformed test pattern and said undeformed test pattern, it is possible to verify a local optical characteristic, for example the distance vision optical power of said verified ophthalmic lens, or an overall optical characteristic, such as the "optical design" of said verified ophthalmic lens specific to the designer thereof. It is therefore possible using the method according to the invention to check the optical performance of said ophthalmic lens and in particular to verify whether the optical design of said ophthalmic lens has been respected during its manufacture. It is also possible to detect illicit reproduction of an "optical design".

In optics, a "test pattern" is defined generally as being a device that allows an optical instrument to be checked. Mention may be made, by way of example, of the Siemens and Foucault test patterns or the chequerboard "lens checker" test pattern.

In the context of the present invention, the expression "test pattern" will particularly be understood to mean a means for verifying the verified ophthalmic lens.

It will be seen in the description of the various embodiments of the invention that this means will possibly either be physical, for example a set of contrasted features printed on a medium or displayed on a screen, or virtual, for example the image of a contrasted object, in particular the image of another test pattern, seen through a lens.

In practice, said ophthalmic lens may be provided for this purpose with said deformed test pattern and/or said undeformed test pattern in order to allow the optician who ordered it to test the optical characteristics of this verified ophthalmic lens by implementing the verifying method according to the invention.

Advantageously, provision may be made, prior to step a), for a step of determining said deformed test pattern depending on said expected optical characteristic.

Said deformed test pattern then contains information relating to said expected optical characteristic, thereby allowing the optician checking said verified ophthalmic lens to rapidly deduce the conformity of said verified optical characteristic to said expected optical characteristic of said verified ophthalmic lens.

Again advantageously, provision may be made, prior to step a), for a step of determining said deformed test pattern depending on said undeformed test pattern. Prior to step a), said deformed test pattern is constructed depending on an intermediate test pattern, said intermediate test pattern being the image of said undeformed test pattern through an expected ophthalmic lens having said expected optical characteristic under initial optical conditions such that, under said set optical conditions of step a), the relative positions of said image test pattern and of said deformed test pattern relative to said verified ophthalmic lens are identical to the respective relative positions of said undeformed test pattern and of said intermediate test pattern relative to said expected ophthalmic lens under the initial optical conditions.

This especially makes it possible to prevent multiplication of the number of original test patterns and therefore handling errors by an optician having to test a large number of ophthalmic lenses. Specifically, the optician then has at their disposal only one single undeformed test pattern that is combinable, using the verifying method according to the invention, with any image test pattern, constructed from a deformed test pattern received with an ordered verified ophthalmic lens.

According to other nonlimiting and advantageous features of the method according to the invention:
  said intermediate test pattern is determined by an optical ray tracing calculation under said initial optical conditions corresponding to the observation of said expected ophthalmic lens from the center of an observation pupil, said optical ray tracing calculation being carried out depending on at least one of the following parameters:
    the position of said observation pupil relative to said expected ophthalmic lens;
    the position of said observation pupil relative to said undeformed test pattern; or
    the position of said undeformed test pattern relative to said expected ophthalmic lens;
  said undeformed test pattern and/or said deformed test pattern and/or said image test pattern consist of a tiling of features of various colors or various gray levels, possibly having various transparency levels;
  said deformed test pattern is determined depending on said undeformed test pattern so that said test test pattern has a uniform contrast;
  said deformed test pattern is determined depending on said undeformed test pattern so that said test test pattern represents a recognizable sign independent of said verified ophthalmic lens;
  step b) consists in superposing said image test pattern on said undeformed test pattern.

The invention also provides a device for verifying the conformity of a verified optical characteristic of a verified ophthalmic lens to an expected optical characteristic, comprising:
  a first holder, able to receive said verified ophthalmic lens;
  a second holder, able to receive at least one deformed test pattern; and
  illuminating means, able to illuminate said deformed test pattern,
  these three being arranged in order to allow an image test pattern corresponding to the image of said deformed test pattern through said verified ophthalmic lens to be formed when said verified ophthalmic lens is placed on said first holder; and
  image-acquiring means, able to capture at least said image test pattern;
  image-combining means for combining said image test pattern with said undeformed test pattern in order to form a test test pattern; and
  electronic processing means programmed to compare said test test pattern to at least one reference test pattern, and to deduce the conformity of said verified optical characteristic of said verified ophthalmic lens to said expected optical characteristic depending on this comparison.

The following are other advantageous and nonlimiting features of the device according to the invention:
  said image-acquiring means capture an image of said test test pattern and transmit said captured image to the electronic processing means;
  said image-acquiring means capture an image of said image test pattern, and said device also comprises a storage unit able to deliver said undeformed test pattern to said image-combining means;
  said electronic processing means comprise a local processing unit, able to communicate with said image-acquiring means and/or said image-combining means, and a remote processing unit able to communicate with said local processing unit via a network, said operations of comparing said test test pattern with said reference test pattern and of deducing the conformity of said verified optical characteristic to said expected optical characteristic being carried out by said local processing unit or said remote processing unit;
  said local processing unit communicates to said remote processing unit a reference of said verified ophthalmic lens and said remote processing unit delivers to said local processing unit said reference test pattern associated with said verified ophthalmic lens;
  said device comprises regulating means that make it possible to adjust the relative position of said first and second holders, of said illuminating means and of said image-acquiring means with respect to one another.

DETAILED DESCRIPTION OF AN EXAMPLE EMBODIMENT

The following description, given with regard to the appended drawings and by way of nonlimiting example, will allow the invention and how it may be implemented to be better understood.

In the appended drawings:

By way of preamble, it will be noted that identical or corresponding elements of the various embodiments shown in the figures will be referenced by the same reference signs and will not be redescribed each time.

Figure 1:
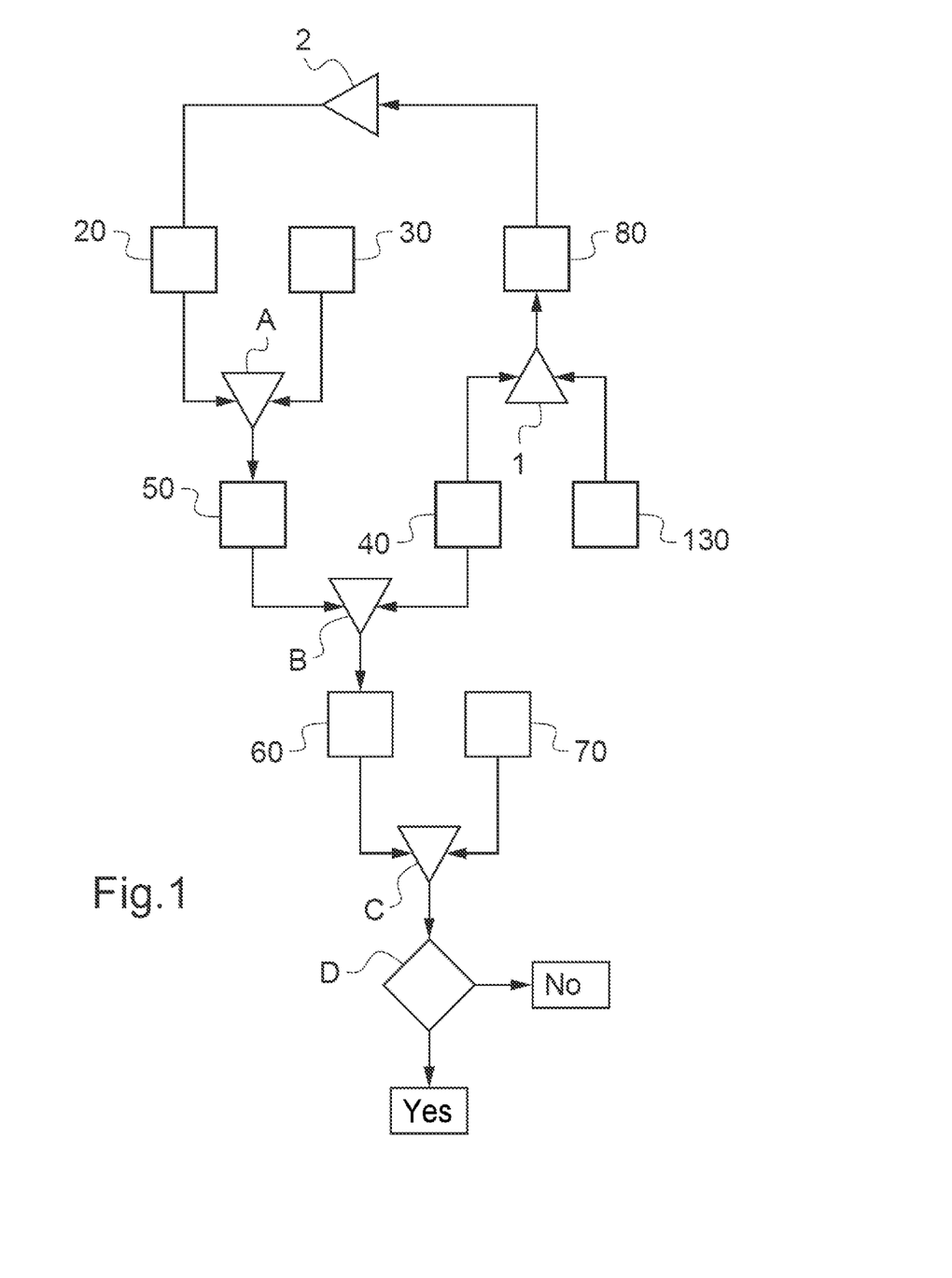
FIG. 1 is a block diagram of the verifying method according to the invention.

FIG. 1 shows a schematic block diagram of an exemplary embodiment of the verifying method according to the invention. Implementation of this method makes it possible to verify that a verified optical characteristic of a verified ophthalmic lens 30, such as shown in FIGS. 2, 9, 10 and 11, conforms to an expected optical characteristic.

It is for example a question, for a progressive ophthalmic lens, of a distance vision power, near vision power or the progression length of the lateral offset between the near vision point and the distance vision point (referred to as the "VP inset"). For a corrective ophthalmic lens allowing astigmatism to be corrected, it may be a question of the power or the angle of the added cylinder.

Figure 6:
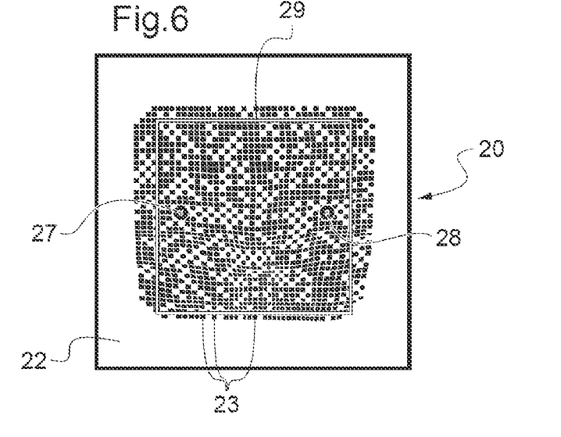
FIG. 6 shows a deformed test pattern determined from the intermediate test pattern shown in FIG. 5.

To do this, starting here with a first test pattern 20 having a nonuniform contrast, an example of which is shown in FIG. 6, an image test pattern 50, i.e. the image of said first test pattern 20 through the verified ophthalmic lens 30, is determined, in a step a) represented by the block A in FIG. 1, under set optical conditions.

The expression "nonuniform contrast" is here understood to mean that the first test pattern 20 comprises contrasted features and is not of uniform brightness or color.

Next, in a step b) shown by the block B in FIG. 1, a second test pattern 40 is then combined with the image test pattern 50 to form a test test pattern 60.

Figure 4:
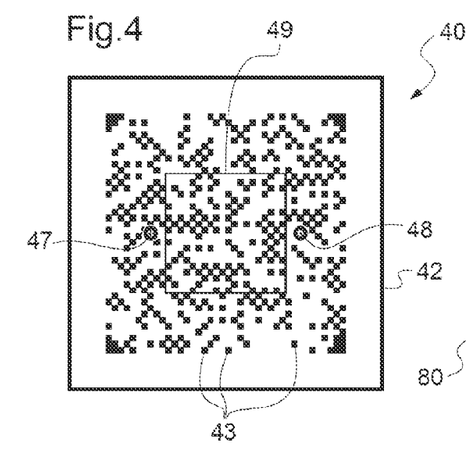
FIG. 4 is a front view of a first example of an undeformed test pattern of square shape comprising a tiling of black and white square features.

FIG. 4 shows a suitable exemplary second test pattern 40, which will be described in more detail below.

Figure 7:
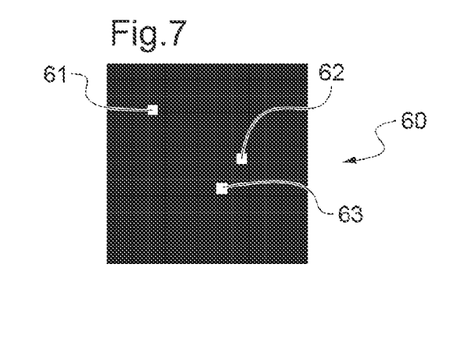
FIG. 7 shows the test test pattern obtained by superposing the undeformed test pattern in FIG. 4 and the image test pattern that is the image of the deformed test pattern in FIG. 6 through a verified ophthalmic lens.

FIG. 7 shows the test test pattern 60 corresponding to the superposition of the image test pattern 50 and the second test pattern 40 shown in FIG. 4.

Figure 8:
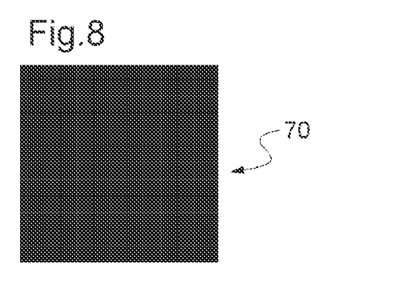
FIG. 8 shows a reference test pattern to be compared with the test test pattern shown in FIG. 7.

In a step c) shown by the block C in FIG. 1, the test test pattern 60 is lastly compared to at least one reference test pattern 70, an example of which is shown in FIG. 8.

This comparison makes it possible to deduce, in a step d) of the method, which step is represented by the block D in FIG. 1, whether the optical feature of the verified ophthalmic lens 30 conforms to the expected optical characteristic.

In the case where the verified optical characteristic of the verified ophthalmic lens 30 conforms to the expected optical characteristic, said test test pattern 60 is substantially identical to said reference test pattern 70 used in the comparing step.

In the exemplary embodiment of the verifying method according to the invention described with reference to FIGS. 1 to 17, the first test pattern 20 is a deformed test pattern (see FIG. 6) and the second test pattern 40 is an undeformed test pattern (see FIG. 4).

What this means is that the deformed test pattern 20 is an object comprising contrasted features that are obtained by determining the image, through an ophthalmic lens, of an initial object comprising contrasted initial features.

The features of the deformed test pattern 20 thus correspond to the initial features deformed by passage of the light rays through this ophthalmic lens.

In contrast, the second test pattern 40 is an undeformed test pattern: its contrasted features are not determined by any kind of deformation induced by an ophthalmic lens of the initial features.

Advantageously, using the verifying method according to the invention, said deformed test pattern 20 is determined, prior to step a), depending on said expected optical characteristic, and more particularly also depending on the undeformed test pattern 40.

More precisely, the deformed test pattern 20 is preferably constructed from an intermediate test pattern 80 in a step prior to step a), which is represented by block 2 in FIG. 1, which itself is preferably determined from the undeformed test pattern 40, as schematically shown in FIG. 1 by the block 1.

According to one particularly advantageous embodiment described in more detail below, the intermediate test pattern 80 is the image under initial optical conditions of the undeformed test pattern 40 through an expected ophthalmic lens 130 that has the expected optical characteristic.

These initial optical conditions make it possible to determine the intermediate test pattern 80 corresponding to the set optical conditions for an image test pattern 50 formed in the way described above.

Therefore, it will be understood that the deformed test pattern 20 and the undeformed test pattern 40 are intimately related to each other by the expected ophthalmic lens 130, insofar as the deformed test pattern 20 is obtained from the image of the undeformed test pattern 40 through this expected ophthalmic lens 130.

Specifically, since the expected ophthalmic lens 130 contains, like any ophthalmic lens, optical aberrations, the image of the undeformed test pattern 40 through this expected ophthalmic lens 130 is deformed by the latter.

Figure 2:
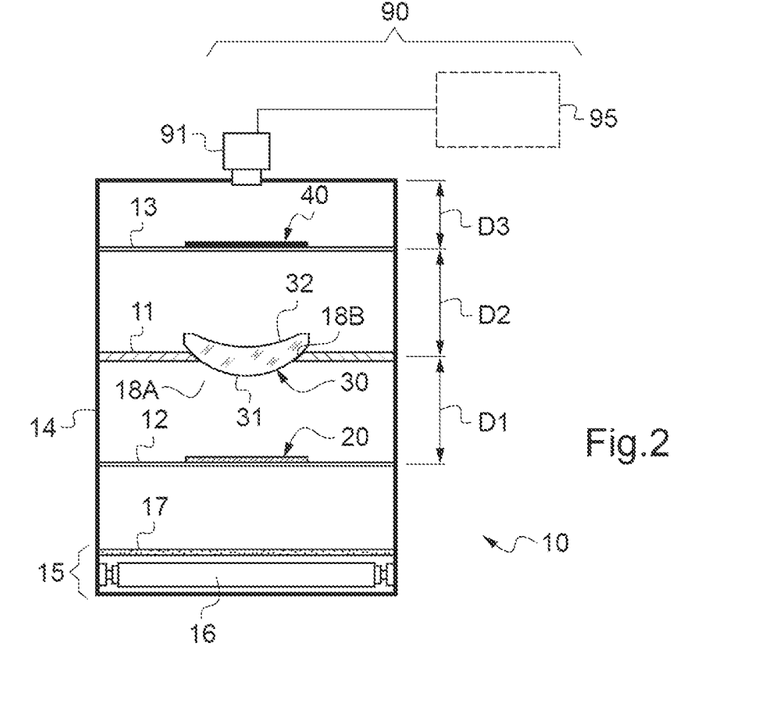
FIG. 2 is an overview of a first embodiment of the verifying device according to the invention.
Figure 3:
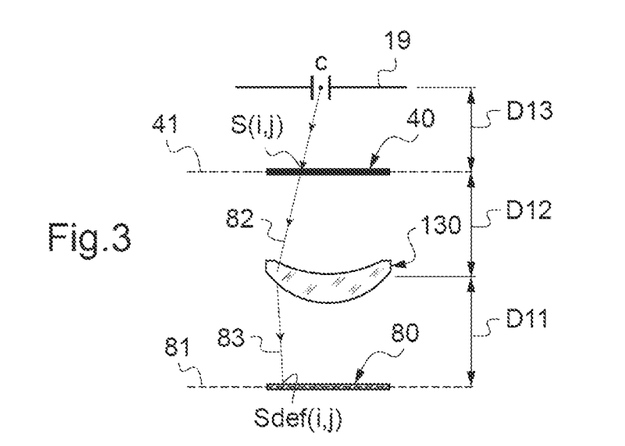
FIG. 3 is an optical schematic describing the principle of the optical ray tracing calculation allowing an intermediate test pattern to be determined from an undeformed test pattern and a deformed test pattern to be constructed.

The way in which the set optical conditions correspond to the initial optical conditions will be understood in light of FIGS. 2 and 3.

Preferably, block 1 corresponds to a prior step of optical calculation. What is meant by this is that the intermediate test pattern 80 is calculated depending on the expected ophthalmic lens 130 from the undeformed test pattern 40 by virtue of an optical ray tracing method, which will be described in more detail below.

FIGS. 2, 9, 10 and 11 show four embodiments of a verifying device 10 allowing the method according to the invention to be implemented.

This verifying device 10 is shown here in a vertical configuration, but it will be understood that the device is not limited to this configuration. Nevertheless, reference will be made below to the top and bottom portions of the verifying device corresponding to this vertical configuration.

The device 10 comprises a frame 14 equipped with means for mounting the various elements, which are described in more detail below.

Whatever the embodiment of the device 10 considered, it comprises a first holder 11 able to receive a verified ophthalmic lens 30 for which it is desired to verify the conformity to an expected optical characteristic.

This first holder 11 is here placed in a substantially horizontal position.

The first holder 11 is preferably opaque. It possesses an aperture 18A in its center allowing light rays to pass through the verified ophthalmic lens 30 placed on the first holder 11.

The aperture 18A is encircled by an edge 18B against which the outline of the verified ophthalmic lens 30 rests.

The shape and size of the edge 18B of the aperture 18A are such that the verified ophthalmic lens 30 is held in place facing the aperture 18A.

The verified ophthalmic lens 30 here has, for example, a convex and spherical front face 31, and the movement of the verified ophthalmic lens 30 on the first holder 11 about the circular aperture 18A is limited. Thus, the positioning of the verified ophthalmic lens 30 is here facilitated thereby.

The first holder 11 furthermore preferably comprises means for centering the verified ophthalmic lens 30 on the aperture 18A. It may for example be a question of a system of pins present on the first holder 11, which pins are suitable for interacting with recesses provided on the periphery of the verified ophthalmic lens 30.

The pins then insert into the recesses in order to hold the ophthalmic lens in the desired position.

The first holder 11 may also comprise locating means allowing the center of the aperture 18A to be pinpointed. It may for example be a question of a set of lines placed on either side of the aperture 18A.

The verified ophthalmic lens 30 then also comprises permanent or temporary locating means placed on one of its faces 31, 32. It may for example be a question of markings used to center the lens or of transparent labels applied to at least one of the faces 31, 32 of the verified ophthalmic lens 30, said labels comprising one or more lines allowing certain meridians of the verified ophthalmic lens 30 to be located. Positioning the verified ophthalmic lens 30 relative to the aperture 18A so that the marks of the verified ophthalmic lens 30 and the locating lines of the first holder 11 are aligned makes it possible to ensure that the verified ophthalmic lens 30 is precisely centered relative to the aperture 18A of the first holder 11.

As a variant, the first holder may be transparent and then not comprise an aperture.

The device 10 also comprises a second holder 12 here able to receive the deformed test pattern 20.

The arrangement of this second holder 12 varies depending on the envisioned embodiment and will be described in more detail below.

Figure 9:
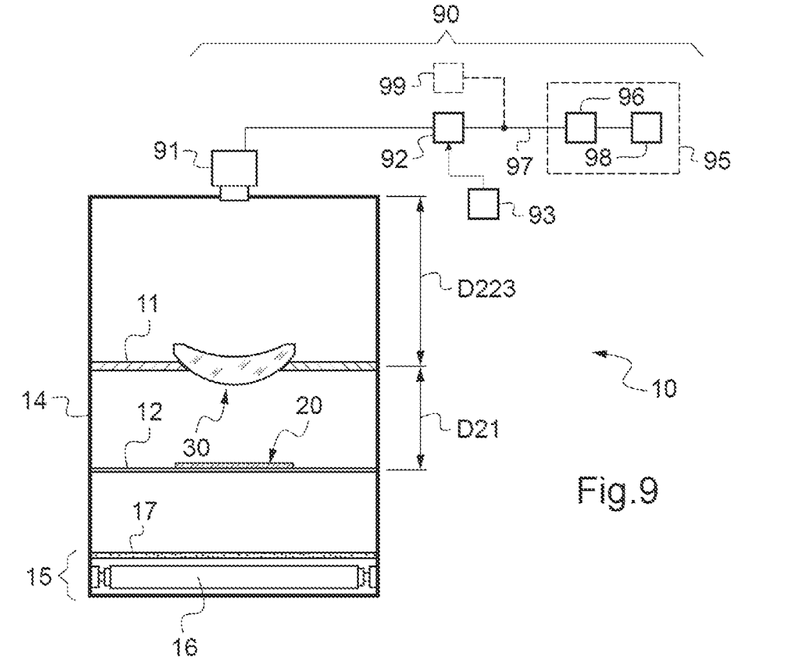
FIG. 9 is an overview of a second embodiment of a verifying device according to the invention, comprising a storage unit delivering an undeformed test pattern and electronic processing means comprising a local processing unit and a remote processing unit.
Figure 10:
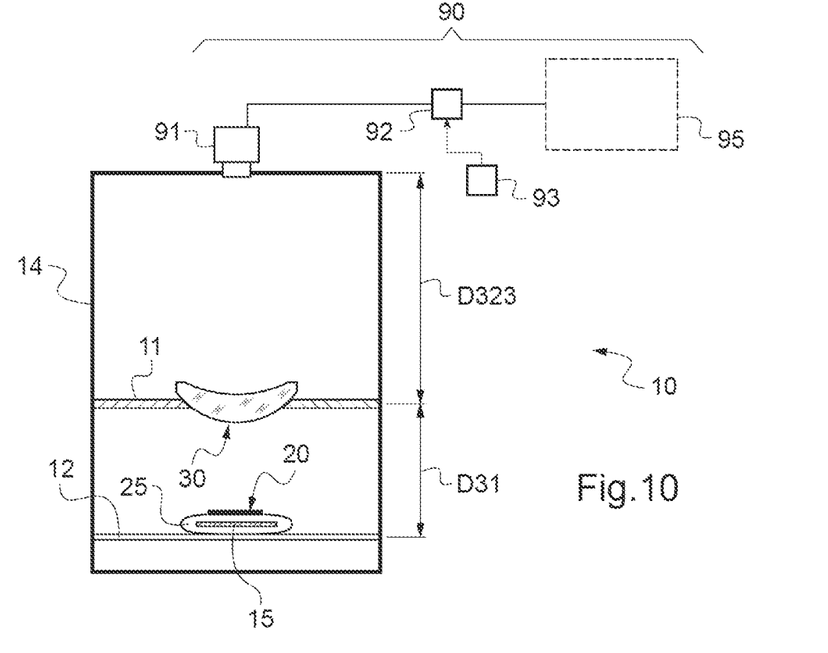
FIG. 10 is an overview of a third embodiment of a verifying device according to the invention, in which the deformed test pattern originates from a digital display device.
Figures 11, 12, 13:
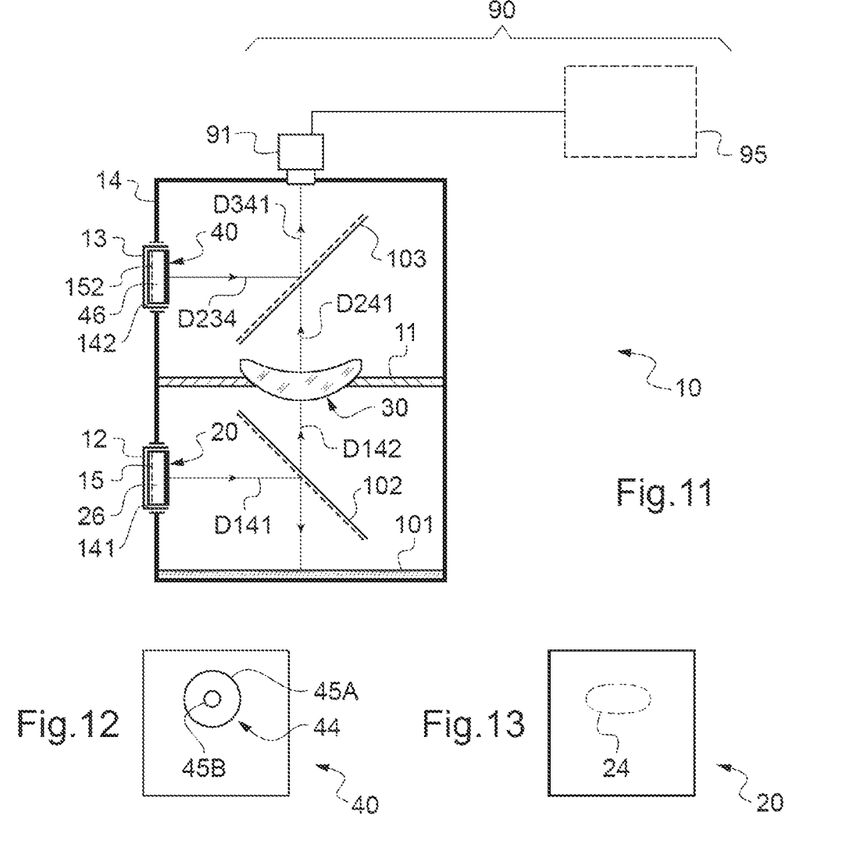
FIG. 11 is an overview of a fourth embodiment of a verifying device according to the invention, using redirecting mirrors and in which the deformed test pattern and the undeformed test pattern originate from digital display devices.
FIG. 12 shows a second example of an undeformed test pattern comprising a local zone of interest.
FIG. 13 shows a deformed test pattern comprising a particular object figure.

The deformed test pattern 20 may be an analog pattern, i.e. one borne by a physical medium, as is the case in the embodiments shown in FIGS. 2 and 9, or a digital pattern, i.e. one stored in the memory of an electronic or information-processing device and displayed on a digital apparatus, such as is the case of the embodiments shown in FIGS. 10 and 11.

In the latter case, provision is then made for means for displaying the digital deformed test pattern 20. These display means may furthermore form said second holder and/or said illuminating means, as will be described in more detail below. The device 10 furthermore comprises illuminating means 15 here able to illuminate the deformed test pattern 20.

The illuminating means 15 may comprise a direct or indirect light source, as will be described in more detail below in the various embodiments.

The expression "direct light source" is here understood to mean a light source emitting light rays intrinsically, in the absence of any other light source.

The expression "indirect light source" is understood to mean a secondary light source that reflects and/or scatters light emitted by another light source. It may then be a question of a simple white surface illuminated by ambient light.

The device 10 in addition comprises image-acquiring means 91 able to capture an image of the image test pattern 50. In this first embodiment, the image test pattern 50 is the image of the deformed test pattern 20 through the verified ophthalmic lens 30.

The image-acquiring means 91 are preferably a digital video camera that allows images to be captured at particular instants.

As a variant, it may for example be a question of a camera, or of a video camera of a cell phone or tablet computer.

The device 10 also comprises image-combining means (13;92;103) able to combine the image test pattern 50 with, here, the undeformed test pattern 40 in order to form a test test pattern 60.

The device 10 lastly comprises electronic processing means 95 able to communicate with said image-combining means 92 delivering the signal representative of the test test pattern 60.

The electronic processing means 95 are thus programmed to compare the test test pattern 60 to at least one reference test pattern 70, and to deduce the conformity of the verified optical characteristic of the verified ophthalmic lens 30 to the expected optical characteristic. In other words, the electronic processing means 95 analyze the signal representative of the test test pattern 60 in order to deliver a signal representative of the conformity of the verified optical characteristic to the expected optical characteristic.

The image-acquiring means 91 and the electronic processing means 95 form part of an electronic processing chain 90.

In a first embodiment of the device 10, shown in FIG. 2, the deformed test pattern 20 and the undeformed test pattern 40 are analog test patterns each formed by a physical medium, as will be explained in more detail below.

The first holder 11 is placed in a middle portion of the frame 14 of the device 10.

Said illuminating means 15 are placed at one of the ends of the frame 14 of the device 10, here at the bottom end of this device, and said image-acquiring means 91 are placed at the other end of the device 10, here at the top end of the device.

In practice, the illuminating means 15 here comprise an arrangement of fluorescent tubes 16 emitting white light and a scatterer 17 allowing the distribution of light emitted by the fluorescent tubes 16 to be made uniform. The scatterer 17 may for example consist of a translucent glass plate covered with a scattering layer, here placed parallel to the first holder 11. Here, these illuminating means 15 are a direct light source.

The second holder 12 of the deformed test pattern 20 is placed substantially horizontally between the first holder 11 and the illuminating means 15.

This second holder 12 of the deformed test pattern 20 is located at a first distance D1 from the first holder 11 of the verified ophthalmic lens 30.

In order to transmit the light received from the illuminating means 15 optimally, i.e. in a way that minimizes distortion, absorption and scattering, the second holder 12 preferably consists of a thin transparent plate made of mineral or organic glass and for example of polymethyl methacrylate or polycarbonate, this plate being of small thickness, for example smaller than 1 millimeter in thickness.

As a variant, the second holder may consist of an opaque plate pierced at its center with an aperture of a size and shape suitable for letting the light issued from the illuminating means pass, in order to allow the deformed test pattern to be illuminated.

The deformed test pattern 20 comprises a film that is at least partially transparent. Said deformed test pattern 20 is for example formed by printing features 23 onto a sheet 22 made of a transparent plastic. The features may have various levels of transparency, be colored or have a set gray level.

The features may for example be completely transparent or completely opaque.

The deformed test pattern 20 therefore transmits light with an intensity and/or color distribution that is dependent on the various features present in the deformed test pattern 20. It will therefore be understood that the contrast of the deformed test pattern 20 is nonuniform.

An exemplary embodiment of the deformed test pattern 20 is shown in FIG. 6. This deformed test pattern 20 has a nonuniform contrast and here comprises a transparent sheet 22 with opaque black features 23 forming an irregular tiling.

It must be understood that here the opaque black features 23 completely absorb the light whereas the portions represented in white in FIG. 6 are transparent, i.e. they transmit substantially all the light.

The device 10 in FIG. 2 furthermore comprises a third holder 13 able to receive the undeformed test pattern 40.

For the same reasons as those mentioned for the second holder 12, the third holder 13 preferably comprises a thin transparent plate.

As a variant, the third holder 13 may comprise an opaque plate pierced at its center with an aperture of a size and shape suitable for letting light having passed through the verified ophthalmic lens 30 pass, in order to allow the undeformed test pattern 40 to be illuminated.

The third holder 13 is placed between the first holder 11 and the image-acquiring means 91. Here the third holder 13 is located at a second distance D2 from the first holder 11 of the ophthalmic lens 30.

The undeformed test pattern 40 is an analog test pattern. It consists, similarly to the deformed test pattern 20, of an at least partially transparent film or sheet comprising features with various transparency levels, the features being colored or having a set gray level.

In the exemplary embodiment of the undeformed test pattern 40 shown in FIG. 4, the latter comprises a transparent sheet 42 and opaque black square features 43 forming a regular tiling. The features of the undeformed test pattern 40 are therefore right and regular, and are not deformed in any particular way. It will therefore be understood that the contrast of the undeformed test pattern 40 is nonuniform.

As above, the features represented in black in FIG. 4 absorb substantially all the light coming from the ophthalmic lens 30, whereas the white features are transparent, i.e. they transmit the light. Thus, the undeformed test pattern 40 in FIG. 4 may for example be produced by printing on a transparent film.

How the deformed test pattern 20 in FIG. 6 is obtained from the undeformed test pattern 40 in FIG. 4 will be described in detail below.

As a variant, the undeformed test pattern could be a test pattern of the type shown in FIG. 6, with deformed black squares, so that the deformed test pattern obtained from the undeformed test pattern depending on the expected ophthalmic lens is a test pattern of the type shown in FIG. 4.

The relative positions of the various constituent optical elements of the verifying device according to the invention, namely: the deformed test pattern 20, the verified ophthalmic lens 30, the undeformed test pattern 40 and said image-acquiring means 91, are precisely set, i.e. with a positioning precision of about 0.1 millimeters, by the relative positions of the first, second and third holders 11, 12, 13 relative to the frame 14 of the device 10.

For this purpose, the device 10 comprises regulating means that make it possible to position the first and second holders 11, 12, said illuminating means 15 and said image-acquiring means 91 relative to one another.

These regulating means for example comprise a graduated rule that at least one of the vertical struts of the frame 14 of the device 10 is equipped with. They may also comprise pointing means that each of the first 11, second 12 and third 13 holders are equipped with, and that allow the position of each of these holders to be determined by reading the corresponding graduation on the graduated rule.

Furthermore, in order to position the deformed test pattern 20 and/or the undeformed test pattern 40 very precisely relative to the verified ophthalmic lens 30, the deformed test pattern 20 and/or the undeformed test pattern 40 also comprise specific locating means 27, 28, 29, 47, 48, 49 suitable for interacting with micro-engravings present on the surface of the verified ophthalmic lens 30, or with any other permanent or temporary mark placed on this verified ophthalmic lens 30.

The micro-engravings or permanent or temporary marks of the ophthalmic lens 30 for example form lines, points or any other particular figure. It is for example a question of the markings used to center the lens during its manufacture.

The means 27, 28, 29 for locating the deformed test pattern 20 and/or the means 47, 48, 49 for locating the undeformed test pattern 40 may be reference points or particular figures, for example lines, circles, squares or crosses, said locating means 27, 28, 29, 47, 48, 49 being placed in various locations on said deformed test pattern 20 and undeformed test pattern 40.

In the examples shown in FIGS. 4 and 6, provision is for example made for two circular locating points 27, 28, 47, 48 and a square 29, 49 on each of the deformed test pattern 20 and undeformed test pattern 40.

Thus, the ophthalmic lens 30 may be placed in a precise transverse position relative to the deformed test pattern 20 and/or the undeformed test pattern 40 by superposing the locating means 27, 28, 29, 47, 48, 49 present on the deformed test pattern 20 and/or the undeformed test pattern 40 on the micro-engravings present on the surface of the verified ophthalmic lens 30 in the image recorded by the image-acquiring means 91.

Moreover, provision may be made for each of the second and third holders 12, 13 to comprise means for receiving the corresponding deformed test pattern 20 or the undeformed test pattern 40, facilitating the transverse positioning of the deformed test pattern 20 relative to the undeformed test pattern 40. It may for example be a question of slide rails. The corresponding test pattern may then comprise a frame suitable for interacting with these slide rails.

The image-acquiring means 91 are located at a third distance D3 above the third holder 13 of the undeformed test pattern 40, such that the third holder 13 is placed between the first holder 11 of the verified ophthalmic lens 30 and said image-acquiring means 91.

The first, second and third distances D1, D2 and D3 separating the first and second holders 11, 12, the first and third holders 11, 13 and the third holder 13 and the image-acquiring means 91, respectively, at least partially form the set optical conditions of use of the verifying device 10.

These distances are preset depending on the initial optical conditions used to calculate the deformed test pattern 20 from the undeformed test pattern 40, as will be described in more detail below.

They thus depend on the expected optical characteristic of the lens.

The first, second and third distances D1, D2 and D3 are in particular set so that the device 10 allows an image test pattern 50, i.e. here the image of the deformed test pattern 20 through the verified ophthalmic lens 30, to be formed in a plane substantially coincident with the plane in which the undeformed test pattern 40 is located.

Thus, in this first embodiment, said image-combining means comprise the third holder 13 of the undeformed test pattern 40. Specifically, it is by virtue of the third holder 13 that it is possible here to precisely position the undeformed test pattern 40 in the plane of the image test pattern 50 so that, in this plane, the undeformed test pattern 40 and the image test pattern 50 superpose to form the test test pattern 60 the image of which is captured by said image-acquiring means 91.

An operator who desires to verify the conformity of a verified optical characteristic of a verified ophthalmic lens 30 to an expected optical characteristic receives said verified ophthalmic lens 30 and an associated deformed test pattern 20 that he places in the device 10 according to the invention.

The deformed test pattern 20 is associated with set optical conditions of the device 10.

Thus, according to a first possibility, the deformed test pattern 20 received by the operator is accompanied by the values to be used for the first, second and third distances D1, D2 and D3. The operator then adjusts, by virtue of the various regulating means described above, the relative positions of the various elements of the device depending on the required values.

According to a second possibility, the values to be used for the first, second and third distances D1, D2 and D3 are fixed and preset depending on the device. The operator then has no additional adjustments to make to the device 10.

The undeformed test pattern 40 may be different for each of the verifying devices 10 in service at an operator, allowing this undeformed test pattern 40 to be adapted to the configuration of the device 10 and to set optical conditions, especially set distances D1, D2 and D3.

In contrast, it is possible to use the same undeformed test pattern 40 for all the ophthalmic lenses to be verified in a given device 10. In this case, the undeformed test pattern 40 may be permanently placed in the device 10.

In practice, to implement the method according to the invention, the operator places the received verified ophthalmic lens 30 on the first holder 11 of the device 10. He then adjusts its position using centering means present on the first holder 11 and on one of the faces 31, 32 of the verified ophthalmic lens 30.

The front face 31 of the verified ophthalmic lens 30 here for example comprises a label comprising two lines representing the horizontal and vertical axes of the verified ophthalmic lens 30.

Having made this adjustment, the operator places the deformed test pattern 20 shown in FIG. 6 on the second holder 12 of the device 10.

It is a question here of the case where the first, second and third distances D1, D2 and D3 are preset and fixed.

As a variant, the operator adjusts the first distance D1 between the first holder 11 and the second holder 12 by means of the graduated rule of the frame 14 of the device 10 depending on indications delivered with the deformed test pattern 20.

The operator superimposes the locating points 27, 28 of the deformed test pattern 20 on the micro-engravings present on the verified ophthalmic lens 30 in order to center the deformed test pattern 20 on the verified ophthalmic lens 30.

To do this, the operator displays the images recorded by the image-acquiring means 91. The latter are by construction aligned with the various holders 11, 12, 13 such that the captured images indeed comprise an image of the various test patterns.

It is also envisionable to make this adjustment by eye.

The undeformed test pattern 40 here being unique and independent of the verified ophthalmic lens 30, it is preferably already present in the device 10.

In addition, by construction, the undeformed test pattern 40 is already centered on the first holder 11 of the verified ophthalmic lens 30. The distance between the first holder 11 and the third holder 13 is furthermore already set to a suitable D2 value.

According to one embodiment of the invention, the first, second and third distances D1, D2 and D3 are chosen such that: D1=20 centimeters (cm); D2=5 cm; and D3=13 cm.

Thus configured, the device 10 may be used to verify the conformity of the verified optical characteristic of the verified ophthalmic lens 30 to an expected optical characteristic.

Here, the light rays issued from the illuminating means 15 are filtered by the deformed test pattern 20, pass through the verified ophthalmic lens 30 and are detected by said image-acquiring means 91.

As mentioned above, these light rays form the image test pattern 50, i.e. the image of the deformed test pattern 20 through the verified ophthalmic lens 30, in the plane of the undeformed test pattern 40.

The operator then initiates a measurement and the video camera 91 acquires the image of the test test pattern 60 such as shown in FIG. 7.

The image-acquiring means 91 then deliver a signal representative of the test test pattern 60, depending on the image of the test test pattern 60, to electronic processing means 95.

The step b) of comparing said test test pattern 60 with the reference test pattern 70 is carried out digitally by the electronic processing means 95, for example using image processing techniques known to those skilled in the art.

The reference test pattern 70 used here for the comparison with the test test pattern 60 in FIG. 7 is illustrated in FIG. 8.

This reference test pattern 70 is here stored in a memory of the electronic processing means 95.

As mentioned above, the test test pattern 60 imaged by said image-acquiring means 91 will correspond to the reference test pattern 70 if the verified optical characteristic of the verified ophthalmic lens 30 conforms to the expected optical characteristic.

The reference test pattern 70 shown in FIG. 8 is here a single black color and therefore has a perfectly uniform contrast.

In the example shown here in FIG. 7, the test test pattern 60 contains a few zones of white color 61, 62, 63, here three squares of white color, whereas the rest of the image of the test test pattern 60 is a uniformly black color.

The contrast, color and brightness of the test test pattern 60 will be said to be almost uniform if the test test pattern 60 has a contrast, color or brightness that is uniform over its entire area except for a few zones extending over less than five percent of the total area of the test test pattern 60.

The test test pattern 60 shown in FIG. 7 is compared with the reference test pattern 70 shown in FIG. 8 digitally by the electronic processing means 95, for example using image processing techniques known to those skilled in the art.

If this comparison shows that the color and/or contrast and/or brightness characteristics of the captured image of the test test pattern 60 are perfectly identical to those of the corresponding reference test pattern 70, the electronic processing means 95 deduce that the verified optical characteristic of the verified ophthalmic lens 30 conforms to, i.e. is identical to, the expected optical characteristic.

If this comparison shows that the captured image of the test test pattern 60 contains zones the color and/or contrast and/or brightness of which are not identical to the color, contrast or brightness of the corresponding zones of the reference test pattern 70, the electronic processing means 95 determine a quantity quantifying the difference between the image of the test test pattern 60 and the reference test pattern 70.

This quantity is for example a quantity representative of the area of the test test pattern 60 corresponding to the zones the color, contrast and/or brightness of which are different to that of the corresponding zone of the reference test pattern 70.

It may for example be a question of the number of pixels of the image of the test test pattern 60 corresponding to these zones.

The electronic processing means 95 then compare the value determined for this quantity with a threshold value representing the maximum tolerated area of the differing zones of the reference test pattern 70.

This threshold value for example corresponds to an area equal to five percent of the total area of the image of the test test pattern 60.

If the value determined for this quantity is lower than said threshold value, the electronic processing means 95 deduce that the verified optical characteristic of the verified ophthalmic lens 30 conforms to the expected optical characteristic.

In the contrary case, they deduce that it does not conform.

In practice, here this comparison reveals that three zones of the test test pattern 60, corresponding to the three zones 61, 62, 63 appearing in white in the captured image of the test test pattern 60 shown in FIG. 7, differ from the corresponding zones of the reference test pattern 70, in which these corresponding zones are black.

These three zones 61, 62, 63 here represent less than five percent of the total area of the image of the test test pattern 60.

Thus, the electronic processing means 95 deduce that the verified ophthalmic lens 30 provides a verified optical correction that conforms to the expected optical correction.

Those skilled in the art will know how to adapt the above method of comparison between the test test pattern 60 and the reference test pattern 70 to any embodiment of the undeformed test pattern 40 and deformed test pattern 20 in order to deduce the conformity of the verified optical characteristic of the verified ophthalmic lens 30 to the expected optical characteristic.

Preferably, provision is furthermore made for the electronic processing means 95 to comprise display means 99 that indicate to the operator the result of the comparison.

As mentioned above, the deformed test pattern 20 is determined depending on the undeformed test pattern 40.

Figure 5:
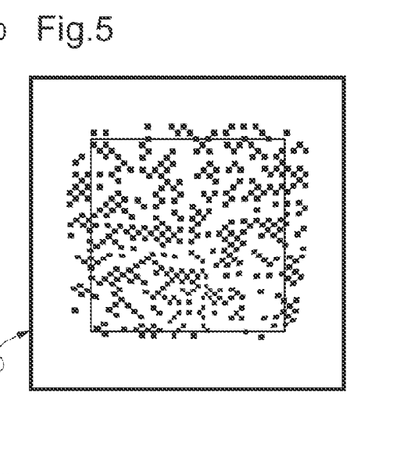
FIG. 5 shows an intermediate test pattern calculated by optical ray tracing through an expected ophthalmic lens from the undeformed test pattern in FIG. 4.

More particularly, the deformed test pattern 20 is constructed depending on an intermediate test pattern 80, an example of which is given in FIG. 5, the intermediate test pattern 80 being determined depending on the expected optical characteristic from the undeformed test pattern 40.

FIG. 3 details how the steps of constructing 6 the deformed test pattern 20 in FIG. 6, and of determining 5 the intermediate test pattern 80 in FIG. 5 from the undeformed test pattern 40 shown in FIG. 4 using an optical ray tracing calculation, are carried out.

To do this, an expected ophthalmic lens 130 having the expected optical characteristic is considered. An observation pupil 19 of center C and the plane 41 of the undeformed test pattern 40 are also considered.

The undeformed test pattern 40 is shown in FIG. 4. Here it consists of a regular tiling of M black and white square features P(i) ($1 \leq i \leq M$) defined by their 4M corners S(i, j) ($1 \leq j \leq 4$).

To construct the deformed test pattern 20, the intermediate test pattern 80, i.e. the image of the undeformed test pattern 40 through the expected ophthalmic lens 130, is, in a first step, calculated using an optical ray tracing method. To do this, the following steps are carried out in succession:

the ray 82 passing through the center C of the observation pupil 19 and through a corner S(i, j) belonging to the undeformed test pattern 40 is calculated;

this incident ray 82 is extended as far as the expected ophthalmic lens 130;

the deviation experienced by the incident ray 82 is calculated in order to determine the ray 83 emergent from the expected ophthalmic lens 130;

the intersection of the emergent ray 83 with the plane 81 of the intermediate test pattern 80 is calculated at the point Sdef(i, j); and the above steps are repeated for all the corners S(i, j) of the undeformed test pattern 40.

To perform the optical ray tracing calculation, the various elements are placed as follows relative to one another:

the expected ophthalmic lens 130 is located at a first distance D11 from the plane 81 of the intermediate test pattern 80;

the plane 41 of the undeformed test pattern 40 is located at a second distance D12 from the expected ophthalmic lens 130; and the observation pupil 19 is located at a third distance D13 above the plane 41 of the undeformed test pattern 40.

These first, second and third distances D11, D12 and D13 define relative positions of the intermediate test pattern 80, of the expected ophthalmic lens 130, of the undeformed test pattern 40, and of the observation pupil 19, which constitute initial optical conditions for the construction of the deformed test pattern 20.

For the optical ray tracing calculation of FIG. 3, used to construct the deformed test pattern 20 such as positioned in FIG. 2, the respective relative positions of the observation pupil 19, of the undeformed test pattern 40, of the expected ophthalmic lens 130 and of the intermediate test pattern 80 are identical to the respective relative positions of the image-acquiring means 91, of the image test pattern 50, of the verified ophthalmic lens 30 and of the deformed test pattern 20.

The first distance D11 between the plane 81 of the intermediate test pattern 80 and the expected ophthalmic lens 130 is therefore equal to the first distance D1 between the deformed test pattern 20 and the verified ophthalmic lens 30 defined above in FIG. 2. Likewise, the second distance D12 between the expected ophthalmic lens 130 and the plane 41 of the undeformed test pattern 40 is equal to the second distance D2 between the verified ophthalmic lens 30 and the undeformed test pattern 40; and the third distance D13 between the undeformed test pattern 40 and the observation pupil 19 is equal to the third distance D3 between the undeformed test pattern 40 and said image-acquiring means 91.

The optical ray tracing calculation such as described above allows the M quadrilateral features Pdef(i) associated with the polygons P(i) of the undeformed test pattern 40 to be determined in the plane 81 of the intermediate test pattern 80. These quadrilaterals Pdef(i) form a deformed regular tiling of features. Therefore, the intermediate test pattern 80 such as shown in FIG. 5 is obtained.

FIG. 5 shows the intermediate test pattern 80 obtained from the undeformed test pattern 40 in FIG. 4 (described above) by carrying out an optical ray tracing calculation through the expected ophthalmic lens 130 corresponding to the verified ophthalmic lens 30 and providing the following optical correction: spherical power=2 diopters ($\delta$); addition=2 $\delta$; and cylinder=0 $\delta$.

As FIG. 5 shows, the intermediate test pattern 80 has an overall shape that is different from that of the undeformed test pattern 40, and, because of the different deformations introduced by the expected ophthalmic lens 130 used for the calculation, the features of black or white color are no longer square but have a shape that depends on their position in the test pattern.

From the intermediate test pattern 80 shown in FIG. 5, the deformed test pattern 20 such as shown in FIG. 6 is obtained in a second step here by taking the "negative" of the intermediate test pattern 80 shown in FIG. 5. In practice, it is a question here of inverting the distribution of the opaque features and the transparent background. It may therefore be seen that the contrast of the deformed test pattern 20 is nonuniform.

Moreover, FIG. 6 shows that the features of the deformed test pattern 20 are here not right and regular like those of the undeformed test pattern in FIG. 4, but deformed because of the various distortions introduced by the expected ophthalmic lens 130.

As a variant, when constructing the deformed test pattern such as described above, the intermediate test pattern could be transformed while choosing the colors of the features of the deformed test pattern so that superposing the image test pattern on the undeformed test pattern forms a test test pattern in which a recognizable sign such as a logo, shape or text appears.

According to this variant, the recognizable sign is independent of the verified ophthalmic lens. The recognizable sign may for example be set and chosen a priori in order to prevent possible counterfeiting.

It will be noted, regarding the rest of the description, that the undeformed test pattern 40, intermediate test pattern 80 and deformed test pattern 20 shown in FIGS. 4, 5 and 6, respectively, are also used in the embodiments described in FIGS. 9, 10 and 11. This applies whether the deformed test pattern 20 and/or undeformed test pattern 40 are analog or digital.

In a second embodiment of the device 10, shown in FIG. 9, the undeformed test pattern 40 is not an analog test pattern, i.e. an actual, physical test pattern in the device 10, as was the case in the case of the first embodiment of the device 10 described above with regard to FIG. 2.

Here, the undeformed test pattern 40 is digital, i.e. "virtual" insofar as it only exists in a digital medium suitable for storing and delivering the undeformed test pattern 40.

The device 10 therefore does not comprise a third holder for the undeformed test pattern 40.

The electronic processing chain 90 here comprises a storage unit 93 that holds in memory the undeformed test pattern 40. This storage unit 93 is here the memory of a cell phone.

As a variant, it may be a question of the memory of a desktop computer, a tablet computer or any means allowing the undeformed test pattern to be stored in a digital medium.

The illuminating means 15, the first and second holders 11, 12 and said image-acquiring means 91 are identical to those described for the first embodiment with regard to FIG. 2.

Because of the absence of the third holder and the use of a digital undeformed test pattern 40, said image-acquiring means 91 are here suitable for capturing an image of the image test pattern 50 in a plane comprised between the verified ophthalmic lens 30 and said image-acquiring means 91.

The image-acquiring means 91 therefore do not capture an image of the test test pattern 60, as was the case in the first embodiment.

The image-combining means 92 are here digital and electronic.

They are suitable for receiving here a signal representative of the image test pattern 50 delivered by the video camera 91 and a signal representative of the undeformed test pattern 40 delivered by the storage unit 93.

The image-combining means 92 are then able to combine digitally the image test pattern 50 with the undeformed test pattern 40 in order to form the test test pattern 60, and to deliver a signal representative of the test test pattern 60. This signal representative of the test test pattern 60 is then transmitted to the electronic processing means 95 for analysis.

More precisely, in the second embodiment in FIG. 9, the electronic processing means 95 comprise:
  a local processing unit 96 suitable for communicating directly with said image-combining means 92 via a local network, for example via an Ethernet cable 97; and
  a remote processing unit 98 suitable for communicating with the local processing unit 96, for example via the Internet.

The local processing unit 96 communicates here to the remote processing unit 98 a reference of the verified ophthalmic lens 30, and the remote processing unit 98 delivers to the local processing unit 96 the reference test pattern 70 associated with said verified ophthalmic lens 30 depending on the reference communicated.

The reference of the verified ophthalmic lens 30 for example comprises the following information: the name of the product, the associated prescription, wear position parameters and personalization parameters.

The local processing unit 96 then performs the operation of comparing 3 the test test pattern 60 received from the image-combining means 92 with the reference test pattern 70, then the operation of deducing 4 the conformity or nonconformity of the verified optical characteristic to the expected optical characteristic.

As a variant, the local processing unit communicates to the remote processing unit the reference of the verified ophthalmic lens and the signal representative of the test test pattern delivered by said image-combining means. Then, the remote processing unit performs an operation of comparing the test test pattern received from the local processing unit with the reference test pattern associated with the verified ophthalmic lens, the reference of the latter having been communicated thereto by the local processing unit.

The operation in which the conformity or nonconformity of the verified optical characteristic to the expected optical characteristic is deduced is then carried out by the remote processing unit.

In the second embodiment of the device 10 in FIG. 9, provision is preferably made for image-displaying means 99 suitable for receiving and displaying the signal delivered by said image-acquiring means 91 and representative of the image test pattern 50 or the signal delivered by said image-combining means 92 and representative of the test test pattern 60 in order to allow them to be observed visually by the operator.

The image-displaying means 99 are here a digital monitor.

As a variant, it may for example be a question of the screen of a camera or a digital video camera, the screen of a cell phone or tablet computer, or an image projector associated with a medium suitable for displaying images, such as a substantially white reflective screen, a frosted glass sheet or a glass sheet equipped with a scattering film.

Preferably, said display means 99 are also suitable for receiving and displaying a signal representative of the reference test pattern 70 delivered by the electronic processing means 95. It is then possible to display, on said image-displaying means, the reference test pattern 70 and also the test test pattern 60, so that they may also be seen by the operator.

According to a variant of the second embodiment, said image-acquiring means and said image-displaying means form part of the same capture and display apparatus.

It may for example be a question of a cell phone or a tablet computer comprising both at least a digital video camera and a digital display screen.

In practice, to implement the method according to the invention, the operator first carries out the same operations with the verified ophthalmic lens 30 and with the deformed test pattern 20 as those described above in the first embodiment described above with regard to FIG. 2.

He especially takes care, by virtue of the regulating means placed on the frame 14 of the device 10, to place:
 the verified ophthalmic lens 30 at a distance D223 from the video camera 91; and
 the deformed test pattern 20 at a distance D21 from the verified ophthalmic lens 30.

These distances D21 and D223 are equivalent to the distance D1 and to the sum of the distances D2 and D3 of the first embodiment, respectively, and form at least partially the set optical conditions of the device 10. They are identical to the initial optical conditions used to calculate the deformed test pattern 20, as in the first embodiment.

In the embodiment envisioned here, they are associated with the deformed test pattern 20 and delivered therewith, or indeed they are fixed and the deformed test pattern 20 is calculated accordingly.

The operator then connects his cell phone, which here forms said storage means 93, to said image-combining means 92 using a suitable data cable. The operator then activates a dedicated application on his cell phone, to which he indicates the reference of the verified ophthalmic lens 30. In return, this application retrieves the undeformed test pattern 40 corresponding to the verified ophthalmic lens 30 from the memory of the cell phone and communicates it to said image-combining means 92 via the data cable.

The image-combining means 92 then electronically and digitally combine the image test pattern 50 with the undeformed test pattern 40 delivered by the cell phone in order to form the test test pattern 60 and thereby deliver a signal representative of the test test pattern 60 to the electronic processing means 95.

The electronic processing means 95 then compare the received test test pattern 60 with at least one reference test pattern 70 depending on the reference of the verified ophthalmic lens 30. Said processing means then deliver a signal representative of the conformity or nonconformity of the verified optical characteristic of the verified ophthalmic lens 30 to an expected characteristic.

The signals representative of conformity and nonconformity may for example be a green indicator light and a red indicator light, respectively.

As a variant, the electronic processing means 95 also transmit the signal representative of the test test pattern 60 to image-displaying means 99 for display. The image-displaying means 99 are here a digital monitor on which the operator may for example check the appearance of the test test pattern 60.

The image-displaying means 99 may also use indicator lights, such as described above, to display the signal representative of conformity.

In a third embodiment of the device 10, shown in FIG. 10, the deformed test pattern 20 is here digital and displayed on the display screen of a cell phone 25.

As a variant, it may for example be a question of a monitor or of the screen of an MP3 player or tablet computer.

The display screen is illuminated by illuminating means 15 internal to the cell phone 25. Here it is a question of the backlighting system of this display screen.

The display screen allows either a single image to be displayed, or a succession of images, or a video.

This display screen is supported by an opaque plate positioned so that the deformed test pattern 20 is at a distance D31 from the verified ophthalmic lens 30. This opaque plate thus plays the role of the second holder 12.

The distance D31 is here equivalent to the distance D1 described in the first and second embodiments.

The rest of the device 10 according to this third embodiment is similar to what was described with reference to the second embodiment.

In particular, the first holder 11 and the electronic processing chain 90 are identical to those of the second embodiment.

The device 10 then allows the image test pattern 50, i.e. the image of the deformed test pattern 20 through the verified ophthalmic lens 30, to be formed, and captured by virtue of said image-acquiring means 91, as in the second embodiment.

In practice, to implement the method according to the invention, the operator places the verified ophthalmic lens 30 on the first holder 11 of the device 10, as in the first embodiment.

The operator takes care, by virtue of the regulating means placed on the frame 14 of the device 10, to place the verified ophthalmic lens 30 at a distance D323 from the video camera 91, this distance being equivalent to the sum of the distances D2 and D3 and to the distance D223 of the first and second embodiments, respectively, and being determined in the same way.

The verified ophthalmic lens 30 is delivered to the operator with a reference, as described above.

The operator then activates a dedicated application on the cell phone 25, to which he indicates the reference of the verified ophthalmic lens 30. In return, this application displays on the screen of the telephone the deformed test pattern 20.

Having done this, the operator places the deformed test pattern 20 on the second holder 12 of the device 10. By means of the graduated rule present on the frame 14 of the device 10, the operator may optionally adjust the distance D31 between the first holder 11 and the second holder 12.

The deformed test pattern 20 displayed on the screen of the cell phone comprises two locating points. The operator uses these points to superpose them on the micro-engravings present on the verified ophthalmic lens 30 in order to center the deformed test pattern 20 on the verified ophthalmic lens 30.

The image-acquiring means 91 then acquire an image of the image test pattern 50 that it transmits to said image-combining means 92.

The rest of the method is implemented identically to what was described with reference to the second embodiment.

The operator may furthermore retrieve the cell phone used to display the deformed test pattern 20 and then make use thereof as a storage unit 93 to deliver an undeformed test pattern 40 to said image-combining means 92, such as described above in the second embodiment.

In a fourth embodiment of the device 10, shown in FIG. 11, the deformed test pattern 20 and the undeformed test pattern 40 are displayed on display screens 26, 46.

The first holder 11 and the electronic processing chain 90 are identical to those of the first embodiment.

The device 10 has a first aperture 141 located in one of its sidewalls, here in its bottom portion, suitable for receiving the second holder 12 of the deformed test pattern 20.

The deformed test pattern 20 consists of a display screen 26, here a video monitor.

As a variant, it may for example be a question of the screen of a cell phone, MP3 player or tablet computer.

The illuminating means 15 are here internal to the video monitor. Here it is a question of the backlighting system of the monitor.

The video monitor here allows a digital video to be displayed. It could be adapted in order to display either a single image, or a succession of images.

The device 10 moreover comprises here in its bottom portion a planar mirror 101. It also comprises a half-silvered mirror 102 placed substantially at 45°, allowing the light originating from the deformed test pattern 20 to be reflected toward the planar mirror 101 then the light reflected by the planar mirror 101 to be transmitted to the verified ophthalmic lens 30.

The deformed test pattern 20 is placed at a distance D141 from the half-silvered mirror 102.

The first holder 11 is located at a distance D142 from the half-silvered mirror 102 such that the sum of the distances D141 and D142 is equal to a distance D41, equivalent to the first distance D1 between the deformed test pattern 20 and the verified ophthalmic lens 30 of the first embodiment.

The device 10 thus configured allows the image test pattern 50, i.e. the image of the deformed test pattern 20 through the verified ophthalmic lens 30, to be formed.

The device 10 furthermore has a second aperture 142 located in the same sidewall as the first aperture 141 but here in its top portion, which is suitable for receiving the third holder 13 allowing the undeformed test pattern 40 to be placed.

Here, the undeformed test pattern 40 is digital and displayed on a display screen 46, here a video monitor.

As a variant, it may for example be a question of the screen of a cell phone, MP3 player or tablet computer.

The display screen 46 is illuminated by illuminating means 152 internal to the video monitor. Here it is a question of the backlighting system of the monitor.

The video monitor here allows a digital video to be displayed. It could be adapted in order to display either a single image, or a succession of images.

According to this fourth embodiment, it is possible to broadcast on each of the display means synchronized videos of deformed test patterns 20 and of original test patterns 40.

Lastly, the device 10 comprises a half-silvered mirror 103 placed substantially at −45°, allowing the light originating from the undeformed test pattern 40 to be reflected toward said image-acquiring means 91.

The half-silvered mirror 103 is placed at a distance D241 from the ophthalmic lens 30 and at a distance D234 from the undeformed test pattern 40.

The image-acquiring means 91 are placed at a distance D341 from the half-silvered mirror 103, such that:

the sum of the distances D234 and D241 is equal to a distance D42 equivalent to the second distance D2 between the verified ophthalmic lens 30 and the undeformed test pattern 40; and the sum of the distances D241 and D341 is equal to a distance D43 equivalent to the third distance D3 between the undeformed test pattern 40 and said image-acquiring means 91.

The various distances D141, D142, D241, D234 and D341 thus defined, the intermediate test pattern 80 may be calculated in the same way as that described with reference to FIG. 3.

In the case of this fourth embodiment, said image-combining means comprise the half-silvered mirror 103. Specifically, it is by virtue of the half-silvered mirror 103 that it is possible here to precisely position the undeformed test pattern 40 in the plane of the image test pattern 50 so that, in this plane, the undeformed test pattern 40 and the image test pattern 50 superpose to form the test test pattern 60 an image of which is captured by said image-acquiring means 91.

The image-acquiring means 91 are able to capture images at a video frequency adapted to the deformed test pattern 20 and to the undeformed test pattern 40. The image-acquiring means 91 are therefore here preferably a digital video camera.

Likewise, if the deformed test pattern 20 and undeformed test pattern 40 are single images or a succession of images displayed at set intervals, said image-acquiring means 91 may for example be a digital camera.

In practice, to implement the method according to the invention, the operator places, as above, the received verified ophthalmic lens 30 on the first holder 11 of the device 10.

By construction, the device 10 of the fourth embodiment does not require additional adjustment insofar as the second and third holders 12, 13 of the deformed test pattern 20 and of the undeformed test pattern 40, respectively, are already positioned in the device 10.

The other steps of the method according to the invention are similar to those described with reference to the first embodiment.

According to a variant common to all the embodiments described above, the undeformed test pattern 40 comprises a local zone of interest. An example is given in FIG. 12 in which the undeformed test pattern 40, of rectangular shape, comprises in its upper central portion an annular zone 44 defined by two circles 45A, 45B that here are concentric.

In contrast, as shown in FIG. 13, the deformed test pattern 20 comprises a particular object FIG. 24 taking the form of a circle elongate in a horizontal direction.

Figure 14:
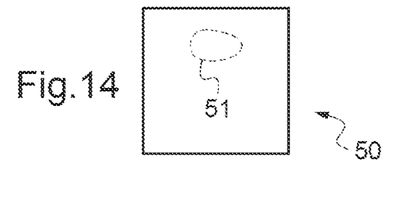
FIG. 14 shows an image test pattern comprising a particular image figure obtained by forming the image of the deformed test pattern shown in FIG. 13 through a verified ophthalmic lens having a verified optical characteristic not conforming to the expected characteristic.

When the image of the deformed test pattern 20 in FIG. 13 is formed through a verified ophthalmic lens 30 having an optical characteristic that it is desired to verify, the distance vision optical power for a progressive corrective lens for example, an image test pattern 50 such as shown in FIG. 14 is obtained. This image test pattern 50 also comprises a particular image FIG. 51 of almost circular shape.

Figure 15:
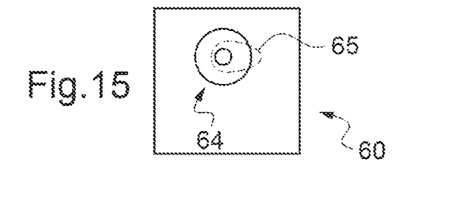
FIG. 15 shows the test test pattern obtained by superposing the undeformed test pattern in FIG. 12 and the image test pattern in FIG. 14.

In the method according to the invention, the image test pattern 50 obtained is superposed on the undeformed test pattern 40 of FIG. 12 in order to obtain the test test pattern 60 shown in FIG. 15. This test test pattern 60 comprises a ring-shaped local zone of interest 64 and a particular FIG. 65 of almost circular shape. It may be seen that the particular FIG. 65 protrudes slightly from the local zone of interest 64.

Figure 16:
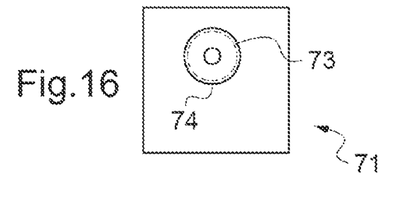
FIG. 16 shows a first reference test pattern to be compared with the test test pattern in FIG. 15.
Figure 17:
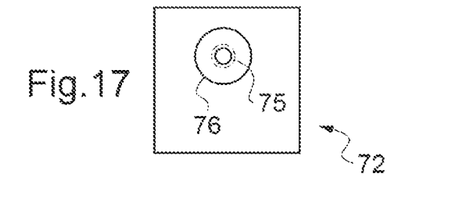
FIG. 17 shows a second reference test pattern to be compared with the test test pattern in FIG. 15.

To verify the conformity of the verified ophthalmic lens 30, here to the distance vision optical power, the test test pattern 60 obtained is compared to the two reference test patterns 71, 72 shown in FIGS. 16 and 17.

These two reference test patterns 71, 72 represent extreme cases for which:
regarding the first reference test pattern 71, the particular FIG. 73 is located on the outside edge of the ring 74 forming a local zone of interest; and
regarding the second reference test pattern 72, the particular FIG. 75 is located on the inside edge of the ring 76 forming a local zone of interest.

Conformity is deduced if the shape and relative position of the particular FIG. 65 present in the test test pattern 60 is for example located between the two extreme situations represented by the reference test patterns 71, 72. Thus, in the present case of the test test pattern 60 shown in FIG. 15, it may be deduced that the verified optical characteristic, here distance vision optical power, does not conform to the expected optical characteristic because the particular FIG. 65 protrudes slightly from the local zone of interest 64.

To verify the conformity of various optical characteristics of a given verified ophthalmic lens 30, it is possible to envision providing a plurality of pairs of test patterns each comprising an undeformed test pattern 40 and an associated deformed test pattern 20, each of the pairs of test patterns serving to check a particular aspect of the verified corrective ophthalmic lens 30, for example: near vision power, distance vision power, the position of the 85% addition point, the position of the meridian or the shape and surface finish of the front face or back face of the ophthalmic lens 30.

As another variant, the deformed test pattern may be located "at infinity" relative to the verified ophthalmic lens, i.e. be located at a distance from the verified ophthalmic lens that is very large compared to its focal length. In this case, the steps of the method according to the invention are not modified.

To verify the conformity of an optical characteristic for an extensive range of ophthalmic lenses, it is furthermore possible to envision inserting an additional optical system between said image-acquiring means and the ophthalmic lens to be verified in order to limit the extent of the powers of the various ophthalmic lenses of a range and to use the verifying device over the most extensive range possible. The additional optical system may for example be an autofocusing system or a series of optical lenses of various constant powers allowing all of the verified ophthalmic lenses to be adjusted to a narrow range of distance vision powers.

Lastly, it is possible to envision, as a variant, a verifying device using neither image-acquiring means nor electronic processing means. It may for example be a question of a device in which the orifice normally reserved for the positioning of the objective of the image-acquiring means is left free.

In this case, the operator may observe directly by eye the image of the deformed test pattern and undeformed test pattern. The test patterns are combined in the mind of the operator as the images of the test patterns merge. He may then compare the test test pattern observed with at least one reference test pattern associated with the verified ophthalmic lens.

This reference test pattern is moreover delivered on a suitable medium. It may for example be a question of a sheet on which the reference test pattern is shown or indeed the display screen of a monitor, cell phone or tablet computer.

The invention claimed is:

1. A method for verifying the conformity of a verified optical characteristic of a verified ophthalmic lens to an expected optical characteristic, on the basis of an undeformed test pattern and a deformed test pattern each having a nonuniform contrast, said method comprising steps of:
    a) determining an image test pattern, i.e. the image of said deformed test pattern through said verified ophthalmic lens, under set optical conditions;
    b) combining said image test pattern with said undeformed test pattern in order to form a test test pattern;
    c) comparing said test test pattern to at least one reference test pattern; and
    d) deducing the conformity of said verified optical characteristic to said expected optical characteristic depending on the preceding comparison.

2. The verifying method as claimed in claim 1, in which said deformed test pattern is determined, prior to step a), depending on said expected optical characteristic.

3. The verifying method as claimed in claim 1, in which said deformed test pattern is determined, prior to step a), depending on said undeformed test pattern.

4. The verifying method as claimed in claim 3, furthermore comprising a step consisting, prior to step a), in constructing said deformed test pattern depending on an intermediate test pattern, said intermediate test pattern being the image of said undeformed test pattern through an expected ophthalmic lens having said expected optical characteristic under initial optical conditions such that, under said set optical conditions of step a), the relative positions of said image test pattern and of said deformed test pattern relative to said verified ophthalmic lens are identical to the respective relative positions of said undeformed test pattern and of said intermediate test pattern relative to said expected ophthalmic lens under said initial optical conditions.

5. The verifying method as claimed in claim 4, in which said intermediate test pattern is determined by an optical ray tracing calculation under said initial optical conditions corresponding to the observation of said expected ophthalmic lens from the center of an observation pupil, said optical ray tracing calculation being carried out depending on at least one of the following parameters:
- the position of said observation pupil relative to said expected ophthalmic lens;
- the position of said observation pupil relative to said undeformed test pattern; or
- the position of said undeformed test pattern relative to said expected ophthalmic lens.

6. The verifying method as claimed in claim 1, in which said undeformed test pattern and/or said deformed test pattern and/or the image test pattern consist of a tiling of features of various colors or various gray levels, possibly having various transparency levels.

7. The verifying method as claimed in claim 1, in which said deformed test pattern is determined depending on said undeformed test pattern so that said test test pattern has a uniform contrast.

8. The verifying method as claimed in claim 1, in which said deformed test pattern is determined depending on said undeformed test pattern so that said test test pattern represents a recognizable sign, said recognizable sign being independent of said verified ophthalmic lens.

9. The verifying method as claimed in claim 1, in which step b) consists in superposing said image test pattern on said undeformed test pattern.

10. A device for verifying the conformity of a verified optical characteristic of a verified ophthalmic lens to an expected optical characteristic, comprising:
- a first holder, able to receive said verified ophthalmic lens;
- a second holder, able to receive at least one deformed test pattern; and
- illuminating means, able to illuminate said deformed test pattern,
- these three being arranged in order to allow an image test pattern corresponding to the image of said deformed test pattern through said verified ophthalmic lens to be formed when said verified ophthalmic lens is placed on said first holder; and
- image-acquiring means, able to capture at least said image test pattern;
- image-combining means for combining said image test pattern with said undeformed test pattern in order to form a test test pattern; and
- electronic processing means programmed to compare said test test pattern to at least one reference test pattern, and to deduce the conformity of said verified optical characteristic of said verified ophthalmic lens to said expected optical characteristic depending on this comparison.

11. The verifying device as claimed in claim 10, in which said image-acquiring means capture an image of said test test pattern and transmit said captured image to the electronic processing means.

12. The verifying device as claimed in claim 10, in which said image-acquiring means capture an image of said image test pattern, said device also comprising a storage unit able to deliver said undeformed test pattern to said image-combining means.

13. The verifying device as claimed in claim 10, in which said electronic processing means comprise:
- a local processing unit, able to communicate with said image-acquiring means and/or said image-combining means; and
- a remote processing unit, able to communicate with said local processing unit via a network;
- in which the operations of comparing said test test pattern with said reference test pattern and of deducing the conformity of said verified optical characteristic to said expected optical characteristic are carried out by said local processing unit or said remote processing unit.

14. The verifying device as claimed in claim 13, in which:
- said local processing unit communicates to said remote processing unit a reference of said verified ophthalmic lens; and
- said remote processing unit delivers to said local processing unit said reference test pattern associated with said verified ophthalmic lens.

15. The verifying device as claimed in claim 10, comprising regulating means that make it possible to adjust the relative position of said first and second holders, of said illuminating means and of said image-acquiring means.

16. The verifying method as claimed in claim 2, in which said deformed test pattern is determined, prior to step a), depending on said undeformed test pattern.

17. The verifying method as claimed in claim 16, furthermore comprising a step consisting, prior to step a), in constructing said deformed test pattern depending on an intermediate test pattern, said intermediate test pattern being the image of said undeformed test pattern through an expected ophthalmic lens having said expected optical characteristic under initial optical conditions such that, under said set optical conditions of step a), the relative positions of said image test pattern and of said deformed test pattern relative to said verified ophthalmic lens are identical to the respective relative positions of said undeformed test pattern and of said intermediate test pattern relative to said expected ophthalmic lens under said initial optical conditions.

18. The verifying method as claimed in claim 17, in which said intermediate test pattern is determined by an optical ray tracing calculation under said initial optical conditions corresponding to the observation of said expected ophthalmic lens from the center of an observation pupil, said optical ray tracing calculation being carried out depending on at least one of the following parameters:
- the position of said observation pupil relative to said expected ophthalmic lens;
- the position of said observation pupil relative to said undeformed test pattern; or
- the position of said undeformed test pattern relative to said expected ophthalmic lens.

19. The verifying device as claimed in claim 11, in which said electronic processing means comprise:
- a local processing unit, able to communicate with said image-acquiring means and/or said image-combining means; and
- a remote processing unit, able to communicate with said local processing unit via a network;
- in which the operations of comparing said test test pattern with said reference test pattern and of deducing the conformity of said verified optical characteristic to said expected optical characteristic are carried out by said local processing unit or said remote processing unit.

20. The verifying device as claimed in claim 12, in which said electronic processing means comprise:
- a local processing unit, able to communicate with said image-acquiring means and/or said image-combining means; and a remote processing unit, able to communicate with said local processing unit via a network;
in which the operations of comparing said test test pattern with said reference test pattern and of deducing the conformity of said verified optical characteristic to said expected optical characteristic are carried out by said local processing unit or said remote processing unit.

* * * * *